United States Patent
Formo et al.

(10) Patent No.: US 10,212,492 B2
(45) Date of Patent: Feb. 19, 2019

(54) METHOD AND MONITORING CENTRE FOR SUPPORTING SUPERVISION OF EVENTS

(71) Applicant: Telefonaktiebolaget LM Ericsson (publ), Stockholm (SE)

(72) Inventors: Joakim Formo, Åkersberga (SE); Marcus Nyberg, Hägersten (SE); Vlasios Tsiatsis, Solna (SE); Anna Viggedal, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/917,292

(22) PCT Filed: Sep. 10, 2013

(86) PCT No.: PCT/SE2013/051051
§ 371 (c)(1),
(2) Date: Mar. 8, 2016

(87) PCT Pub. No.: WO2015/038040
PCT Pub. Date: Mar. 19, 2015

(65) Prior Publication Data
US 2016/0219348 A1 Jul. 28, 2016

(51) Int. Cl.
*G08C 19/22* (2006.01)
*H04Q 9/00* (2006.01)
(Continued)

(52) U.S. Cl.
CPC ............ *H04Q 9/00* (2013.01); *G08B 25/002* (2013.01); *G08B 25/009* (2013.01); *H04N 7/188* (2013.01);
(Continued)

(58) Field of Classification Search
CPC .... H04Q 9/00; H04Q 2209/40; G08B 25/002; G08B 25/10; G08B 13/19669; G08B 29/188; G08B 25/009; H04N 7/188
(Continued)

(56) References Cited

U.S. PATENT DOCUMENTS 6,704,798 B1 * 3/2004 Mogul ................ H04L 67/2823
348/33
6,735,630 B1 5/2004 Gelvin et al.
(Continued)

FOREIGN PATENT DOCUMENTS

EP 2227045 A1 9/2010
JP 2006217704 A 8/2006
WO 2013071354 A1 5/2013

OTHER PUBLICATIONS

Kawai, Tetsuya et al., "Proposal of an Assured Corridor Mechanism for Urgent Information Transmission in Wireless Sensor Networks", IEICE Transactions on Communications, vol. E90-B No. 10, Oct. 2007, 2817-2826.

*Primary Examiner* — Zhen Y Wu
(74) *Attorney, Agent, or Firm* — Murphy, Bilak & Homiller, PLLC

(57) ABSTRACT

A method and monitoring center (304) for supporting supervision of events in a monitored area (300) based on sensor data (D) reported by sensors over a communication network (302). When the monitoring center (304) detects an abnormal event (E), it identifies a set of sensors (S1-S3) which are potentially impacted by the event, and also identifies network nodes (N1-N3, BS) that are able to communicate sensor data reported by the identified sensors (S1-S3). The monitoring center (304) then instructs (In) the identified network nodes to promote the communication of sensor data reported by the identified sensors. Thereby, transport of the sensor data will be enhanced and it will arrive promptly and
(Continued)

properly at the monitoring center, to enable any watching staff to take notice and evaluate the abnormal event as soon as possible.

24 Claims, 3 Drawing Sheets

(51) Int. Cl.
    *G08B 25/00*     (2006.01)
    *H04N 7/18*     (2006.01)
    *G08B 13/196*     (2006.01)
    *G08B 25/10*     (2006.01)
    *G08B 29/18*     (2006.01)

(52) U.S. Cl.
    CPC ........ *G08B 13/19669* (2013.01); *G08B 25/10* (2013.01); *G08B 29/188* (2013.01); *H04Q 2209/40* (2013.01)

(58) Field of Classification Search
    USPC .................................................. 340/870.07
    See application file for complete search history.

(56) References Cited

U.S. PATENT DOCUMENTS

| | | | |
|---|---|---|---|
| 6,832,251 B1 | 12/2004 | Gelvin et al. | |
| 7,002,470 B1 * | 2/2006 | Miao | G08B 25/009 340/539.1 |
| 7,142,123 B1 * | 11/2006 | Kates | G01N 27/048 340/602 |
| 7,496,059 B2 * | 2/2009 | Yoon | H04L 12/12 370/311 |
| 7,630,326 B1 * | 12/2009 | Shear | H04L 41/0813 370/254 |
| 7,978,725 B2 * | 7/2011 | Gong | H04L 45/122 370/238 |
| 2003/0218987 A1 * | 11/2003 | Loader | H04L 47/10 370/252 |
| 2007/0140303 A1 | 6/2007 | Kim et al. | |
| 2008/0031139 A1 * | 2/2008 | Muro | H04W 28/08 370/237 |
| 2008/0159280 A1 | 7/2008 | Hwang et al. | |
| 2008/0309449 A1 * | 12/2008 | Martin | H04W 4/90 340/3.1 |
| 2009/0296704 A1 * | 12/2009 | Kim | H04L 45/20 370/389 |
| 2010/0112959 A1 * | 5/2010 | Nakagawa | H04B 1/04 455/68 |
| 2011/0143779 A1 * | 6/2011 | Rowe | G06Q 30/02 455/456.3 |
| 2012/0089370 A1 * | 4/2012 | Chebbo | A61B 5/0002 702/188 |
| 2012/0112901 A1 | 5/2012 | Chasko et al. | |
| 2012/0182894 A1 * | 7/2012 | Gaines | A61B 5/0022 370/252 |
| 2014/0077964 A1 * | 3/2014 | Beligere | E21B 47/00 340/853.3 |
| 2014/0195559 A1 * | 7/2014 | Ko | H04L 67/12 707/770 |

* cited by examiner

METHOD AND MONITORING CENTRE FOR SUPPORTING SUPERVISION OF EVENTS

TECHNICAL FIELD

The present disclosure relates generally to a method and a monitoring centre for supporting supervision of events in a monitored area based on sensor data reported by sensors over a communication network.

BACKGROUND

Equipment and procedures have been developed for monitoring various premises and areas that need to be supervised, where a plurality of sensors are installed at different locations within a monitored area. These sensors are configured to measure or observe some metric or parameter of interest, such as temperature, pressure, voltage, light, motion, sound, presence of objects, presence of smoke, and so forth. Some common examples of monitored "areas" that might need to be supervised include public areas such as city streets, public buildings, stadiums, public transportation, and also more proprietary areas such as private residences, land, vehicles, industrial premises, communication networks, etc. It should be noted that a monitored area may be comprised of an infrastructure such as the above-mentioned examples of public transportation and communication networks. The sensors are connected through a communication network to a monitoring centre or the like and report sensor data comprising information about measurements and observations to the monitoring centre, either at regular intervals or triggered by occurrence of an event, e.g. detection of motion, sound, light, temperature rise, etc.

In this disclosure, information delivered from sensors will be referred to as "sensor data" which could be, without limitation, any information related to measurements and observations performed by the sensors, depending on their functionality. Further, the term "monitoring centre" will be used to represent a functional entity or node which receives sensor data from multiple sensors in a monitored area. The monitoring centre may process and evaluate the sensor data and display information thereof on a monitoring equipment such as a monitoring screen or the like.

An example of how such an arrangement for supervision may be realized in practice is illustrated in FIG. 1 where a plurality of sensors "S" are distributed to different positions within a schematically shown monitored area 100, the sensors being configured to perform various measurements and observations at their positions and to report resulting sensor data "D" which is communicated over a communication network 102 to a monitoring centre 104. The sensor data D is communicated over various nodes and links in the network 102 to arrive at the monitoring centre 104 for review and evaluation. Sensor data from the different sensors travels over different paths and routes in the network depending on where the sensors are located in the network.

Information that reflects the sensor data may be displayed on one or more monitoring screens 106a, 106b . . . that can be watched by some staff present on-site at the monitoring centre 104. Such displayed information may include charts with measurement results, a map image, an infrastructure image, any calculations, graphs or compilations made from received sensor data, and so forth. In the field of telecommunication, a monitoring centre called Network Operation Centre, NOC, is sometimes employed for supervision of a communication network based on, among other things, sensor data reported by sensors located at different nodes and links throughout the communication network. The NOC usually also deals with alarms, complaints, etc., coming from users of services in the network.

When an event is detected in the monitored area that in some sense is "abnormal" by somehow deviating from what is considered to be normal conditions, it is usually of interest to investigate the event and monitor how it develops, e.g. to find out if it gets "worse", more serious or larger in magnitude, and/or to determine whether some action is required to deal with the event and its consequences. Some examples of events that may be considered "abnormal" include fires, accidents, burglary, extreme weather conditions, and equipment malfunction or failure. Before determining what actions need to be taken due to the event, it may be needed to establish some vital facts such as the nature, location, extent, and anticipated consequences of the event.

In this disclosure, the term "abnormal event" is used to represent any event that potentially requires some action to be taken for dealing with the event, such as monitoring or supervising the event and any consequences thereof with increased attention. However, there are some problems associated with the above-described conventional arrangement for supervision. Firstly, it may not be possible to evaluate the event quick enough, e.g., to limit any resulting damages or other negative consequences, and secondly, the information that can be extracted from the reported sensor data may be insufficient or improper for making an accurate evaluation of the event and its consequences and for deciding to take proper actions.

SUMMARY

It is an object of embodiments described herein to address at least some of the problems and issues outlined above. It is possible to achieve this object and others by using a method and a monitoring centre as defined in the attached independent claims.

According to one aspect, a method is performed by a monitoring centre for supporting supervision of events in a monitored area based on sensor data reported by sensors over a communication network. It is assumed that the sensors are distributed in different positions in the monitored area. In this method, the monitoring centre detects an abnormal event in the monitored area based on received sensor data, and identifies a set of sensors that are potentially impacted by the detected abnormal event. The monitoring centre also identifies network nodes in the communication network that are able to communicate sensor data reported by the identified sensors, and instructs the identified network nodes to promote the communication of sensor data reported by the identified sensors.

According to another aspect, a monitoring centre is arranged to support supervision of events in a monitored area based on sensor data reported by sensors over a communication network, the sensors being distributed in different positions in the monitored area. The monitoring centre comprises a data collector that is configured to collect sensor data reported by the sensors. The monitoring centre further comprises a logic unit configured to detect an abnormal event in the monitored area based on received sensor data. The logic unit is also configured to identify a set of sensors impacted by the detected abnormal event, and to identify network nodes in the communication network that are able to communicate sensor data reported from the identified sensors. The monitoring centre further comprises an instruction unit that is configured to instruct the identified network nodes to promote the communication of sensor data from the identified sensors.

The above method and monitoring centre may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

In this disclosure, a solution is presented where it has been recognized that useful sensor data may often be unduly delayed or even lost in the communication network due to deficient or poor transport when the sensor data is communicated to the monitoring centre. A monitoring centre according to embodiments described herein is arranged to operate such that when an abnormal event occurs, a set of network nodes are instructed to promote communication of sensor data reported by sensors that are potentially impacted by the abnormal event, in order to ensure fast and safe arrival of the reported sensor data at the monitoring centre. For example, the network nodes may be instructed to operate such that sensor data from sensors impacted by the abnormal event will take precedence over other data communicated over the network nodes.

The network nodes that are involved in the communication of such sensor data may operate in several different ways to promote the communication, e.g. depending on the type of node and communication technique, which will be described in more detail below. The main purpose in this solution is to achieve enhanced transport of the sensor data from the impacted sensors and ensure that it arrives properly and without too much delay at the monitoring centre, to enable any watching staff to take notice and evaluate the abnormal event as soon as possible. For example, the identified network nodes may be instructed to promote communication of sensor data to ensure a certain throughput of the data, to reduce the latency of the data, and to ensure that not too much data is lost on the way.

Figure 1:
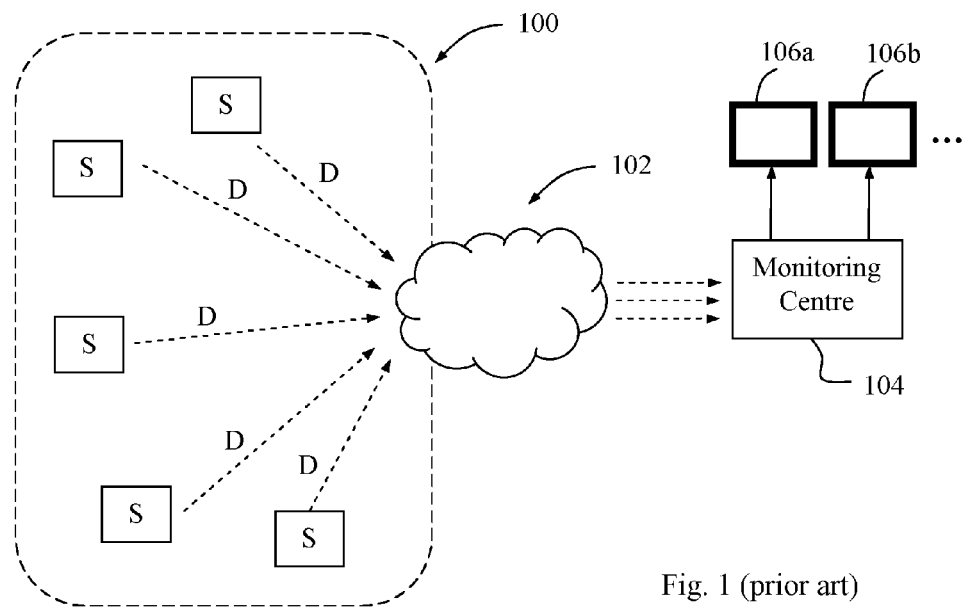
FIG. 1 is a communication scenario illustrating that sensor data is conveyed to a monitoring centre over a communication network, according to the prior art.

An example of how a monitoring centre may operate to support supervision of events in a monitored area according to some possible embodiments, will now be described with reference to the flow chart in FIG. 2. It is assumed that sensors distributed in different positions in the monitored area report sensor data to the monitoring centre. A monitoring equipment may display information that reflects the reported sensor data, e.g. on one or more monitoring screens or panels that can be watched by any supervising personnel, which may be a similar arrangement as illustrated in FIG. 1. The procedure in FIG. 2 may be implemented by means of various functional units or entities in the monitoring centre which will be outlined in more detail later below in some possible examples.

It is also assumed that the sensors across the monitored area, or at least some of them, more or less continuously perform various measurements and observations according to their functionalities, and report resulting sensor data to the monitoring centre over a communication network, either regularly or depending on their measurements and/or observations. A first action 200 illustrates that the monitoring centre receives reported sensor data over the communication network, which may go on constantly in the background throughout the described procedure. The reported sensor data may be collected in a suitable data storage or the like which then may be accessed in order to analyze the sensor data.

The sensors may thus report such sensor data to the monitoring centre on a regular basis or when triggered by a measurement or observation, e.g. when the sensor registers a certain condition such as a temperature rise, a motion, a sound, etc., depending on functionality. It is further assumed that the monitoring centre has a logic functionality that more or less continuously analyzes the reported sensor data in order to detect abnormal events as indicated by the sensor data.

In a next shown action 202, the monitoring centre detects an abnormal event in the monitored area based on received sensor data. As indicated above, an abnormal event is generally deemed to have occurred when one or more of the sensors reports a measurement or observation that in some way deviates from its normal and expected measurements or observations, and which may require some action or at least further attention. To mention a few illustrative but non-limiting examples, an abnormal event may be indicated by a temperature rise, a detected motion, breakage of a window, or a sound out of the ordinary. For example, when analyzing the reported sensor data, the monitoring centre may compare it with various predefined "normality" thresholds and when a reported measurements exceeds, or falls below, a corresponding threshold, an abnormal event can be assumed to have occurred. Once detected, it is likely of interest to monitor and further watch details about the abnormal event and how it develops and the further monitoring is dependent on further sensor data being reported from impacted sensors.

A logic function or the like in the monitoring centre may be operable to analyze reported sensor data in order to detect when an abnormal event occurs. In a possible embodiment, this analysis may be further based on knowledge of previously occurred abnormal events which may have been stored in a knowledge database or the like at the monitoring centre. In other words, the abnormal event may be detected based on historical data that has been stored over time and reflecting previous abnormal events.

Having detected an abnormal event, the monitoring centre then identifies a set of sensors that are at least potentially impacted by the detected event, as shown in a next action 204. This set of potentially impacted sensors may naturally include a first sensor that has reported a measurement or observation deviating from what is normal, e.g. by exceeding or falling below a normality threshold, which has actually triggered detection of the abnormal event in the foregoing action 202, although this set of sensors may also include further sensors which are deemed to be potentially impacted, e.g., by being located nearby around the first sensor.

For example, if a first sensor reports an abnormally high temperature or presence of smoke suggesting a fire, further sensors located close to the first sensor may be included in the set of potentially impacted sensors as they may possibly start to report abnormally high temperatures as well in case intensity and/or magnitude of the fire increases. A logic function in the monitoring centre may operate to analyze reported sensor data and a topology showing how the sensors are placed, for identifying which sensors are potentially impacted by the abnormal event and should be included in the set. This analysis for sensor identification may be further based on the above-mentioned historical data in the knowledge database.

Having identified the impacted sensors, the monitoring centre is also able to identify which network nodes in the communication network are able to communicate sensor data reported by the impacted sensors, and the monitoring centre identifies these network nodes in a further action 206. The monitoring centre may be able to do this based on knowledge of a topology of the communication network, including how the nodes therein are positioned and connected to one another, and also at which points and positions the identified sensors are connected to the communication network. Thereby, the communication path from each one of the identified sensors to the monitoring centre can be determined and all nodes in that path can thus be identified.

The communication network may be comprised of one or more types of network, e.g. fixed, cellular, public and/or private networks, which typically comprise various different types of network nodes that may be involved in the communication of sensor data. To mention a few possible but non-limiting examples, the identified network nodes may comprise any one or more of: a base station of a cellular network, a core node of a cellular network, a packet router, a switch, a relay node, and a node interconnecting a radio access network and a core network. These are thus only examples of configurable network equipment that forwards communication packets, e.g. an Ethernet switch, an Internet Protocol (IP) router, a border Gateway, and so forth.

In a next action 208, the monitoring centre instructs the identified network nodes to promote the communication of sensor data reported by the identified sensors. The monitoring centre may do this by sending an instruction or the like in a suitable message to each of the identified network nodes, effectively triggering each respective node to start operating in a way that somehow promotes, or "helps", the communication of sensor data.

The messages and protocols involved in dispatching such instructions to network nodes depend on how the relevant end-to-end path is arranged. For example, the communication network may comprise network nodes configured for ZigBee or Bluetooth or Internet Engineering Task Force, IETF, Constrained Application Protocol, CoAP. A cellular network may comprise 2G, 3G or LTE base stations, while a core network with forwarding nodes may comprise SDN OpenFlow switches. The Monitoring centre may need to employ CoAP for a CoAP enabled sensor network, 3GPP protocols for configuring a bearer of a base station and the OpenFlow protocol to configure the OpenFlow compliant routers and switches. These are only examples of protocols for different types of network nodes and the embodiments herein are not limited to these examples.

In some possible examples, the identified network nodes are instructed to promote said communication of sensor data by operating to fulfil at least one of the following conditions a-c:
a) The throughput of the sensor data is above a certain pre-set throughput limit, which thus ensures that at least a certain minimum data rate is achieved for the sensor data over the respective network node.
b) The latency of the sensor data in the respective nodes is below a certain pre-set latency limit, which thus ensures that a certain maximum delay time is not exceeded for the sensor data over the respective network node.
c) The amount of lost sensor data in the respective nodes is below a certain pre-set loss rate limit, which thus ensures that no more than a certain maximum amount of sensor data is lost, e.g. dropped, discarded or not found, over the respective network node.

One or more of the above conditions a-c may be fulfilled in several different ways, and some possible examples of how the identified network nodes may be instructed will be outlined below.

In one possible embodiment, the monitoring centre may instruct at least one of the identified network nodes to promote the communication of sensor data by increasing priority for the sensor data. In other words, whenever a data packet with sensor data from an impacted sensor arrives at the network node, this data packet is given a higher priority, if not the highest possible, relative other data flows being communicated through the node. If for example the at least one identified network node is a packet router or any similar node that basically routes data packets from different data flows, the monitoring centre may instruct the packet router to increase the priority for the sensor data in a buffer of the packet router. Thereby, this data packet will be sent out from the node before other data packets pending in the buffer and it can be ensured that the packet will not be excessively delayed by waiting too long in the buffer before output, and/or that it is not discarded from the buffer due to expiry of a timer or the like.

In another possible embodiment, the identified network nodes may comprise a node that is currently "sleeping" by not being active in communication of data, although it may still be able to communicate sensor data reported by one or more of the identified sensors once the sleeping node becomes activated. In that case, the monitoring centre may instruct at least one of the identified network nodes to promote the communication of sensor data by waking up the sleeping node to start communicate sensor data from at least one of the identified sensors. This may be done such that the instructed network node sends a suitable wake-up message to the sleeping node, effectively activating the sleeping node to start communicate the sensor data accordingly. Thereby, the path for the sensor data through the network will be somewhat changed.

In further possible embodiments, the identified sensors may comprise a first wireless sensor and the identified network nodes may comprise a base station in radio communication with the first wireless sensor. In that case, the monitoring centre may instruct the base station to promote the communication of sensor data by performing at least one of the following actions 1-6:
1) The base station may be instructed to deny handovers of other wireless communication devices to the base station, which means that congestion can be avoided in an area, such as a cell, that the base station is currently serving. Otherwise, if such handovers were allowed, congestion could arise involving excessive data traffic with the base station, which in turn might result in reduced data throughput, delayed traffic, high level of interference, dropped data, retransmissions, and so forth, all of which could degrade the communication of the sensor data.

2) If the first wireless sensor is capable of applying Discontinuous Reception, DRX, by turning off its receiver in order to save power, the base station may be instructed to reduce a DRX period for the first wireless sensor. As a result, the first wireless sensor will have its receiver turned on more frequently so that any messages from the base station, e.g., for granting uplink transmission, will get across to the sensor with less delay.

3) The base station may be instructed to establish for the first wireless sensor a radio access bearer with greater bandwidth and/or lower latency for communicating the sensor data, which means that the sensor data can be communicated with increased throughput.

4) The base station may be instructed to establish for the first wireless sensor a multi-path radio link for communicating the sensor data, which likewise means that the sensor data can be communicated with increased throughput, as compared to a single-path radio link, since each added radio link will expand the amount of data that can be communicated per time unit.

5) The base station may be instructed to reduce priority for data from other devices than the first wireless sensor, which means that the data from other devices will not take precedence over the sensor data coming from the first wireless sensor which will effectively be given a higher priority relative to the other devices. This will thus have a similar effect as increasing priority for the sensor data, which was described above.

6) The base station may be instructed to trigger a neighbouring base station to start communicate sensor data from a second wireless sensor of the identified sensors. In this alternative, added sensor data can be reported from the second wireless sensor which could enrich the information that arrives at the monitoring centre. For example, the base station may send a suitable trigger message to the neighbouring base station, either via a common control node or directly over an X2 interface according to LTE or similar, which message triggers the neighbouring base station to start requesting sensor data from the second wireless sensor, or to increase the amount of reported sensor data.

In another possible embodiment, in case there is a second wireless sensor involved such as in alternative 6) above, the monitoring centre may instruct the base station to communicate a wakeup message from the first wireless sensor to the second wireless sensor over the neighbouring base station without routing the wakeup message over a core network. The wakeup message may be send over an X2 interface or the equivalent.

Conventionally, a sleeping base station may be awaken, i.e. activated, by a wireless device that intends to establish a connection with the base station, or it may be awaken by another active base station if the latter base station detects a wireless device that is moving towards the sleeping base station. The type of wake up mechanism in the latter embodiment above is somewhat different from the conventional case mentioned above. In this embodiment, a sensor node that could be stationary intends to wake up one or more other stationary sensor nodes in its geographical vicinity, and the communication path between the active sensor and each sleeping sensor may include a neighboring base station that might be in a sleeping state. It may therefore be necessary to awaken a neighboring base station before any communication between an active sensor and a sleeping sensor can take place.

In yet another possible embodiment, at least some of the identified network nodes may be comprised in a fixed part of the communication network that forms a so-called Software Defined Network, SDN, which comprises nodes that are software controlled by an SDN controller. This embodiment will be described further below with reference to FIG. 5.

Figure 3:
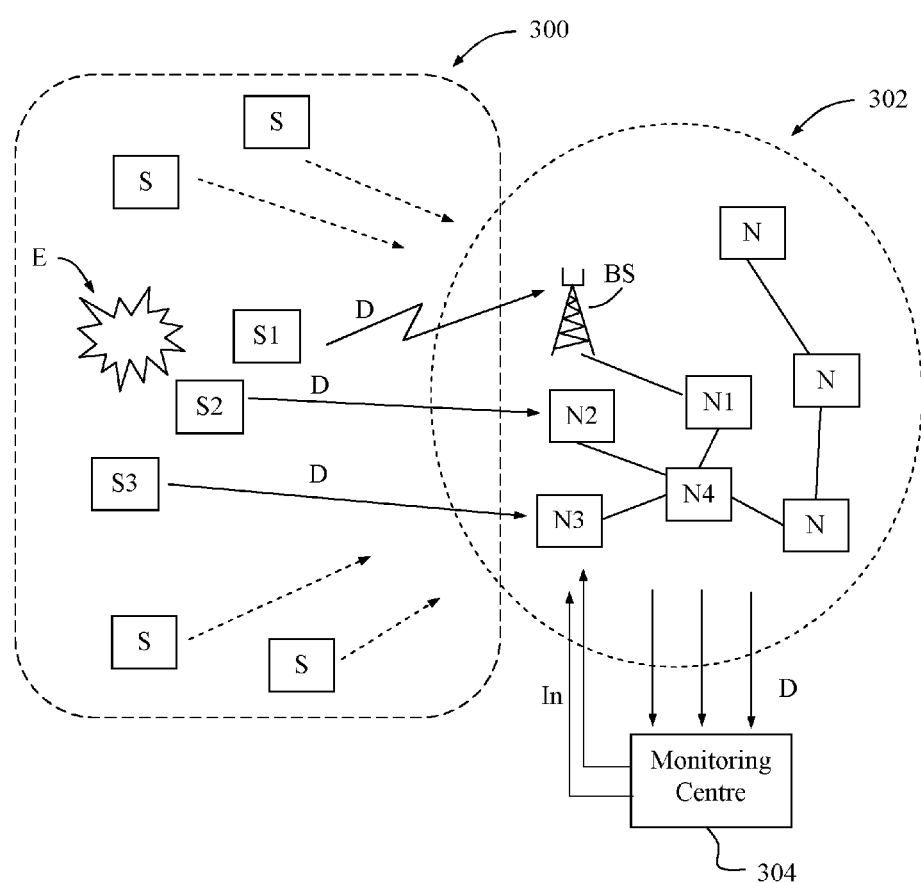
FIG. 3 is another communication scenario illustrating how a monitoring centre may be employed in practice, according to further possible embodiments.

An example of how this solution may be used in practice is illustrated by the scenario of FIG. 3. In this example, various sensors S have been distributed in different positions across a monitored area 300, although only a few of them are shown here for simplicity while in reality there may be hundreds or even thousands of sensors being used for monitoring the area 300. These sensors S send sensor data D more or less continuously over a communication network 302 to the monitoring centre, which is denoted 304 in this figure. The communication network 302 comprises in this case both fixed parts and wireless parts, the latter being represented by a base station BS.

When the monitoring centre 304 detects an abnormal event E, e.g. as described for action 202 above, a set of sensors S1-S3 are identified as being potentially impacted by the event E, e.g. in the manner described for action 204 above. The monitoring centre 304 then also identifies a set of network nodes, N1-N4 and BS, as being able to communicate sensor data reported by the identified sensors S1-S3, e.g. in the manner described for action 206 above. For example, sensor data reported from sensor S1 is communicated over a radio interface to the base station BS and further over wired links through network nodes N1 and N4, before arriving at the monitoring centre 304. It should be noted that this example is greatly simplified and in reality the total path for transporting sensor data from a sensor may comprise more network nodes, e.g. tens of nodes. Also, there may be a much greater number of sensors involved which are potentially impacted by the abnormal event. Basically, this solution may be employed for any range or amount of sensors and/or network nodes and the solution is not limited in this respect.

In FIG. 3, the monitoring centre 304 instructs the identified set of network nodes N1-N4 and BS to promote the communication of sensor data D reported by the identified sensors S1-S3, e.g. in the manner described for action 208 above. The monitoring centre 302 thus sends a suitable instruction denoted "In", which effectively triggers the nodes N1-N4 and BS to start promoting the communication. Several examples of how the network nodes might be instructed to operate in order to promote the communication, were described above.

Figure 4:
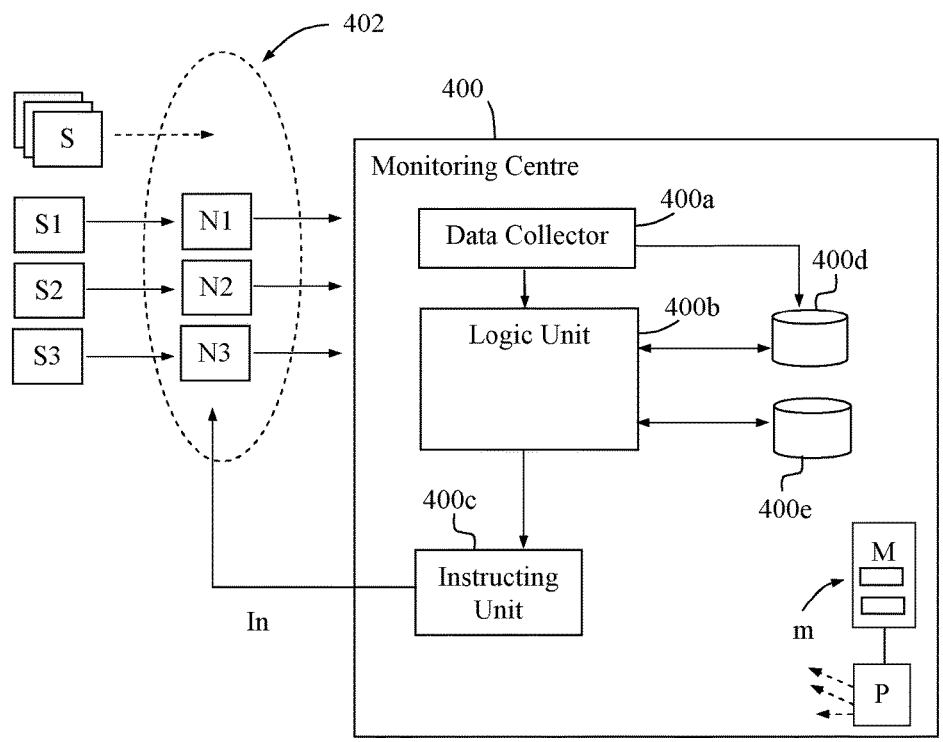
FIG. 4 is a block diagram illustrating a monitoring centre in more detail, according to further possible embodiments.

A detailed but non-limiting example of how a monitoring centre may be structured with some possible functional units to bring about the above-described operation of the monitoring centre, is illustrated by the block diagram in FIG. 4. In this figure, the monitoring centre 400 is arranged to support supervision of events in a monitored area based on sensor data reported by sensors over a communication network 402, the sensors being distributed in different positions in the monitored area, which is not explicitly shown here. The monitoring centre 400 may be configured to operate according to any of the examples and embodiments described above and as follows. The monitoring centre 400 will now be described in terms of some possible examples of employing the solution.

The monitoring centre 400 comprises a data collector 400a that is configured to collect sensor data D reported by the sensors S. The collected sensor data D may be stored in a data storage 400d. The monitoring centre 400 further comprises a logic unit 400b that is configured to detect an abnormal event in the monitored area based on received sensor data D, e.g. as described for action 202 above. The logic unit 400b is also configured to identify a set of sensors S1-S3 which are potentially impacted by the detected abnormal event, e.g. as described for action 204 above. The logic unit 400b is also configured to identify network nodes N1-N3, BS in the communication network that are able to communicate sensor data reported from the identified sensors S1-S3.

The monitoring centre 400 also comprises an instructing unit 400c configured to instruct, "In", the identified network nodes N1-N3, BS to promote the communication of sensor data from the identified sensors, e.g. as described for action 208 above.

The above monitoring centre 400 and its functional units may be configured or adapted to operate according to various optional embodiments. In a possible embodiment, the instruction unit (400c) is configured to instruct the identified network nodes to promote said communication of sensor data by operating to fulfil at least one of:
  throughput of the sensor data is above a throughput limit,
  latency of the sensor data in the respective nodes is below a latency limit, and
  the amount of lost sensor data in the respective nodes is below a loss rate limit.

In another possible embodiment, the instruction unit 400c may be configured to instruct at least one of the identified network nodes to promote the communication of sensor data by increasing priority for the sensor data. For example, if the at least one identified network node is a packet router, the instruction unit 400c may be configured to instruct the packet router to increase the priority for the sensor data in a buffer of the packet router.

In another possible embodiment, the instruction unit 400c may be configured to instruct at least one of the identified network nodes to promote the communication of sensor data by waking up a sleeping node to start communicate sensor data from at least one of the identified sensors.

In case the identified sensors comprise a first wireless sensor and the identified network nodes comprise a base station in radio communication with the first wireless sensor, the instruction unit 400c may be configured to instruct the base station to promote the communication of sensor data by performing at least one of:
  denying handovers to the base station,
  reducing a Discontinuous Reception, DRX, period for the first wireless sensor,
  establishing for the first wireless sensor a radio access bearer with greater bandwidth and/or lower latency for communicating the sensor data,
  establishing for the first wireless sensor a multi-path radio link for communicating the sensor data,
  reducing priority for data from other devices than the first wireless sensor, and
  triggering a neighbouring base station to start communicate sensor data from a second wireless sensor of the identified sensors.

In another possible embodiment, the instruction unit 400c may be configured to further instruct the base station to communicate a wakeup message from the first wireless sensor to the second wireless sensor over the neighbouring base station without routing the wakeup message over a core network. Another possibility is that the logic unit 400b may be configured to detect the abnormal event based on historical data that has been stored over time, e.g. in a suitable storage 400e, and reflecting previous abnormal events.

It should be noted that FIG. 4 illustrates some possible functional units in the monitoring centre 400 and the skilled person is able to implement these functional units in practice using suitable software and hardware. Thus, the solution is generally not limited to the shown structures of the monitoring centre 400, and the functional units 400a-c may be configured to operate according to any of the features and embodiments described in this disclosure, where appropriate.

Figure 2:
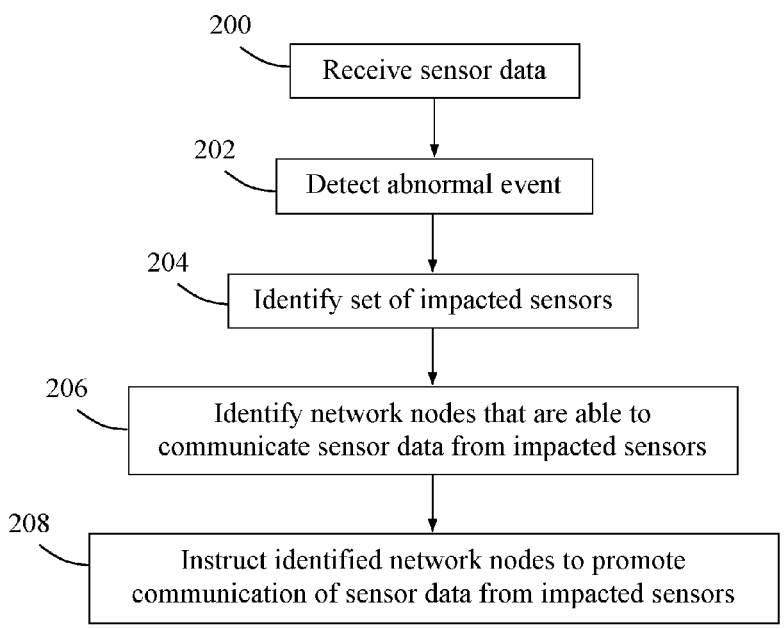
FIG. 2 is a flow chart illustrating a procedure in a monitoring centre, according to some possible embodiments.

The embodiments and features described herein may thus be implemented in a computer program comprising computer readable code which, when run on a monitoring centre, causes the monitoring centre to perform the above actions and functionality described in FIGS. 2-4. Further, the above-described embodiments may be implemented in a computer program product comprising a computer readable medium on which a computer program is stored. The computer program product may be a compact disc or other carrier suitable for holding the computer program. The computer program comprises computer readable code which, when run on a monitoring centre, causes the monitoring centre to perform the above actions and functionality. Some examples of how the computer program and computer program product can be realized in practice are outlined below.

The functional units 400a-d described above may be implemented in the monitoring centre 400 by means of program modules of a respective computer program comprising code means which, when run by a processor "P" causes the monitoring centre 400 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the monitoring centre 400 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the monitoring centre 400.

Figure 5:
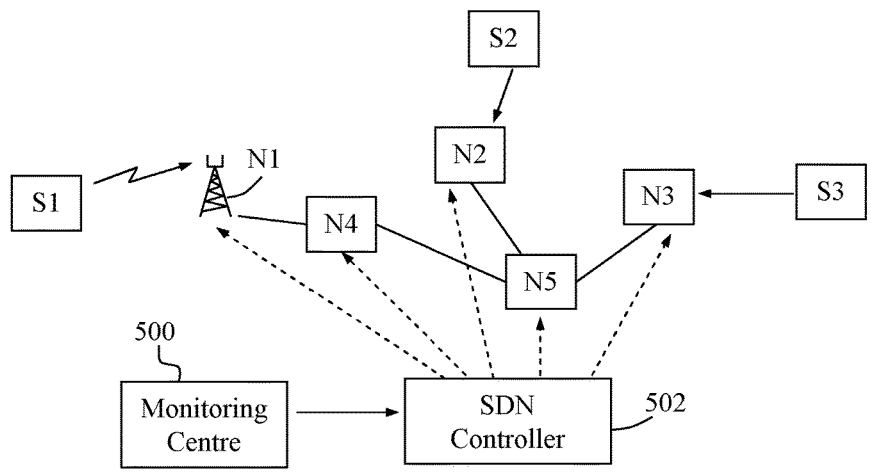
FIG. 5 is another communication scenario illustrating how a monitoring centre may be employed when the communication network comprises a Software Defined Network, SDN, according to further possible embodiments.

It was mentioned above that this solution may be employed for a fixed part of the communication network that forms a SDN which may comprise various switches and routers, as illustrated in FIG. 5. Thus, the network may include both fixed network nodes N2-N5 as well as base stations BS, and nodes that interconnect a Radio Access Network and a mobile core network. These switches, routers and/or base stations N1-N5 may thus be software controlled by an SDN controller 502. In this example, the sensors potentially impacted by the abnormal event include a first sensor S1 being connected to the base station N1, a second sensor S2 being connected to the network node N2, and a third sensor S3 being connected to the network node N3.

These network nodes N1-N5 may be instructed to promote the communication of sensor data, e.g. by achieving lower delay, high throughput and/or lower loss rate. A monitoring centre 500, being operable as described above, may issue instructions towards each respective network node N1-N5 such that the SDN controller 502 propagates the instructions to respective network nodes N1-N5, as shown by dashed arrows. If the nodes should receive the same instruction, the monitoring centre 500 needs to send that instruction once to the SDN controller 502 which then propagates it to all the network nodes N1-N5. Alternatively, different individual instructions may be more suitable to the respective network nodes N1-N5 to trigger them to start promoting the communication as described above.

While the solution has been described with reference to specific exemplary embodiments, the description is generally only intended to illustrate the inventive concept and should not be taken as limiting the scope of the solution. For example, the terms "monitoring centre", "sensor", "abnormal event", "network node", "wakeup message" and "Software Defined Network" have been used in this description, although any other corresponding entities, functions, and/or parameters could also be used having the features and characteristics described here. The solution is defined by the appended claims.

The invention claimed is:

1. A method performed by a monitoring center for supporting supervision of events in a monitored area based on sensor data reported by sensors over a communication network, the sensors being distributed in different positions in the monitored area, the method comprising:
   detecting an abnormal event in the monitored area based on received sensor data;
   identifying a set of sensors potentially impacted by the detected abnormal event;
   identifying network nodes in the communication network that are able to communicate sensor data reported by the identified sensors, wherein the identified network nodes comprise at least one of (i) a base station of a cellular network, (ii) a core node of a cellular network, (iii) a switch, (iv) a relay node, (v) a node interconnecting a radio access network and a core network, and (vi) a packet router, the identified network nodes each being physically separated from the identified sensors by at least a wireless link; and
   instructing the identified network nodes to promote communication through the identified network nodes of sensor data reported by the identified sensors by operating such that sensor data reported by the identified sensors takes precedence, within the respective identified network nodes, over other data communicated over the identified network nodes.

2. The method of claim 1, wherein the identified network nodes are instructed to promote said communication of sensor data by operating to fulfil at least one of:
   throughput of the sensor data through the respective identified network node is above a throughput limit;
   latency of the sensor data in the respective identified network node is below a latency limit; and
   the amount of lost sensor data in the respective identified network node is below a loss rate limit.

3. The method of claim 1, wherein at least one of the identified network nodes is instructed to promote the communication of sensor data by increasing priority, within the at least one of the identified network nodes, for the sensor data.

4. The method of claim 3, wherein the at least one identified network node is a packet router which is instructed to increase the priority for the sensor data in a buffer of the packet router.

5. The method of claim 1, wherein at least one of the identified network nodes is instructed to promote the communication of sensor data by waking up a sleeping node to start communicating sensor data from at least one of the identified sensors.

6. The method of claim 1, wherein the identified sensors comprise a first wireless sensor and the identified network nodes comprise a base station in radio communication with the first wireless sensor, and wherein the base station in radio communication with the first wireless sensor is instructed to promote communication of sensor data via the base station in radio communication with the first wireless sensor by performing at least one of:
   denying handovers to the base station in radio communication with the first wireless sensor;
   reducing a Discontinuous Reception (DRX) period for the first wireless sensor;
   establishing for the first wireless sensor a radio access bearer with greater bandwidth and/or lower latency for communicating the sensor data;
   establishing for the first wireless sensor a multi-path radio link for communicating the sensor data;
   reducing priority for data from other devices than the first wireless sensor; and
   triggering a neighboring base station, differing from the base station in radio communication with the first wireless sensor, to start communicating sensor data from a second wireless sensor of the identified sensors.

7. The method of claim 6, wherein the base station in radio communication with the first wireless sensor is further instructed to communicate a wakeup message from the first wireless sensor to the second wireless sensor over the neighboring base station without routing the wakeup message over a core network.

8. The method of claim 1, wherein at least some of the identified sensors are comprised in a fixed part of the communication network forming a Software Defined Network (SDN) being software controlled by an SDN controller.

9. The method of claim 1, wherein the abnormal event is detected based on historical data that has been stored over time and reflecting previous abnormal events.

10. The method of claim 1, wherein the identified network nodes comprise at least one of (i) a base station of a cellular network, (ii) a core node of a cellular network, (iii) a switch, (iv) a relay node, (v) a node interconnecting a radio access network and a core network, and (vi) an Internet Protocol (IP) packet router.

11. The method of claim 1, wherein the identified network nodes comprise at least one of (i) a base station of a cellular network, (ii) a core node of a cellular network, (iii) a switch, (iv) a relay node, and (v) a node interconnecting a radio access network and a core network.

12. A monitoring center arranged to support supervision of events in a monitored area based on sensor data reported by sensors over a communication network, the sensors being distributed in different positions in the monitored area, the monitoring center comprising:
   a data storage device; and
   a processing circuit configured to
      collect sensor data reported by the sensors and store the collected sensor data in the data storage device, detect an abnormal event in the monitored area based on received sensor data, identify a set of sensors potentially impacted by the detected abnormal event, identify network nodes in the communication network that are able to communicate sensor data reported from the identified sensors, such that the identified network nodes comprise at least one of (i) a base station of a cellular network, (ii) a core node of a cellular network, (iii) a switch, (iv) a relay node, (v) a node interconnecting a radio access network and a core network, and (vi) a packet router, the identified network nodes each being physically separated from the identified sensors by at least a wireless link, and instruct the identified network nodes to promote communication through the identified network nodes of sensor data reported by the identified sensors by operating such that sensor data reported by the identified sensors takes precedence, within the respective identified network nodes, over other data communicated over the identified network nodes.

13. The monitoring center of claim 12, wherein the processing circuit is configured to instruct the identified network nodes to promote said communication of sensor data by operating to fulfil at least one of:

throughput of the sensor data through the respective identified network node is above a throughput limit, latency of the sensor data in the respective identified network node is below a latency limit, and the amount of lost sensor data in the respective identified network node is below a loss rate limit.

14. The monitoring center of claim 12, wherein the processing circuit is configured to instruct at least one of the identified network nodes to promote the communication of sensor data by increasing priority, within the at least one of the identified network nodes, for the sensor data.

15. The monitoring center of claim 14, wherein the at least one identified network node is a packet router and the processing circuit is configured to instruct the packet router to increase the priority for the sensor data in a buffer of the packet router.

16. The monitoring center of claim 12, wherein the processing circuit is configured to instruct at least one of the identified network nodes to promote the communication of sensor data by waking up a sleeping node to start communicating sensor data from at least one of the identified sensors.

17. The monitoring center of claim 12, wherein the identified sensors comprise a first wireless sensor and the identified network nodes comprise a base station in radio communication with the first wireless sensor, and wherein the processing circuit is configured to instruct the base station in radio communication with the first wireless sensor to promote communication of sensor data via the base station in radio communication with the first wireless sensor by performing at least one of:

denying handovers to the base station in radio communication with the first wireless sensor, reducing a Discontinuous Reception (DRX) period for the first wireless sensor, establishing for the first wireless sensor a radio access bearer with greater bandwidth and/or lower latency for communicating the sensor data, establishing for the first wireless sensor a multi-path radio link for communicating the sensor data, reducing priority for data from other devices than the first wireless sensor, and triggering a neighboring base station, differing from the base station in radio communication with the first wireless sensor, to start communicate sensor data from a second wireless sensor of the identified sensors.

18. The monitoring center of claim 17, wherein the processing circuit is configured to further instruct the base station in radio communication with the first wireless sensor to communicate a wakeup message from the first wireless sensor to the second wireless sensor over the neighboring base station without routing the wakeup message over a core network.

19. The monitoring center of claim 12, wherein at least some of the identified sensors are comprised in a fixed part of the communication network forming a Software Defined Network (SDN) being software controlled by an SDN controller.

20. The monitoring center of claim 12, wherein the processing circuit is configured to detect the abnormal event based on historical data that has been stored over time and reflecting previous abnormal events.

21. The monitoring center of claim 12, wherein the processing circuit is configured to identify the network nodes such that the identified network nodes comprise at least one of (i) a base station of a cellular network, (ii) a core node of a cellular network, (iii) a switch, (iv) a relay node, (v) a node interconnecting a radio access network and a core network, and (vi) an Internet Protocol (IP) packet router.

22. The monitoring center of claim 12, wherein the processing circuit is configured to identify the network nodes such that the identified network nodes comprise at least one of (i) a base station of a cellular network, (ii) a core node of a cellular network, (iii) a switch, (iv) a relay node, and (v) a node interconnecting a radio access network and a core network.

23. A method performed by a monitoring center for supporting supervision of events in a monitored area based on sensor data reported by sensors over a communication network, the sensors being distributed in different positions in the monitored area, the method comprising:

detecting an abnormal event in the monitored area based on received sensor data;

identifying a set of sensors potentially impacted by the detected abnormal event;

identifying network nodes in the communication network that are able to communicate sensor data reported by the identified sensors, wherein the identified network nodes comprise at least one of (i) a base station of a cellular network, (ii) a core node of a cellular network, (iii) a switch, (iv) a relay node, (v) a node interconnecting a radio access network and a core network, and (vi) a packet router, the identified network nodes each being physically separated from the identified sensors by at least a wireless link; and instructing the identified network nodes to promote the communication of sensor data reported by the identified sensors, wherein the identified network nodes are instructed to promote said communication of sensor data by operating to fulfil at least one of:

throughput of the sensor data through the respective identified network node is above a throughput limit;

latency of the sensor data in the respective identified network node is below a latency limit; and the amount of lost sensor data in the respective identified network node is below a loss rate limit.

24. A method performed by a monitoring center for supporting supervision of events in a monitored area based on sensor data reported by sensors over a communication network, the sensors being distributed in different positions in the monitored area, the method comprising:
- detecting an abnormal event in the monitored area based on received sensor data;
- identifying a set of sensors potentially impacted by the detected abnormal event;
- identifying network nodes in the communication network that are able to communicate sensor data reported by the identified sensors, wherein the identified network nodes comprise at least one of (i) a base station of a cellular network, (ii) a core node of a cellular network, (iii) a switch, (iv) a relay node, (v) a node interconnecting a radio access network and a core network, and (vi) a packet router, the identified network nodes each being physically separated from the identified sensors by at least a wireless link; and
- instructing the identified network nodes to promote the communication of sensor data reported by the identified sensors, wherein at least one identified network node is a packet router, which is instructed to increase priority for the sensor data in a buffer of the packet router.

\* \* \* \* \*